Dec. 25, 1934.   H. E. MUCHNIC   1,985,544
RETURN BEND JOINT
Filed April 17, 1933   2 Sheets-Sheet 2
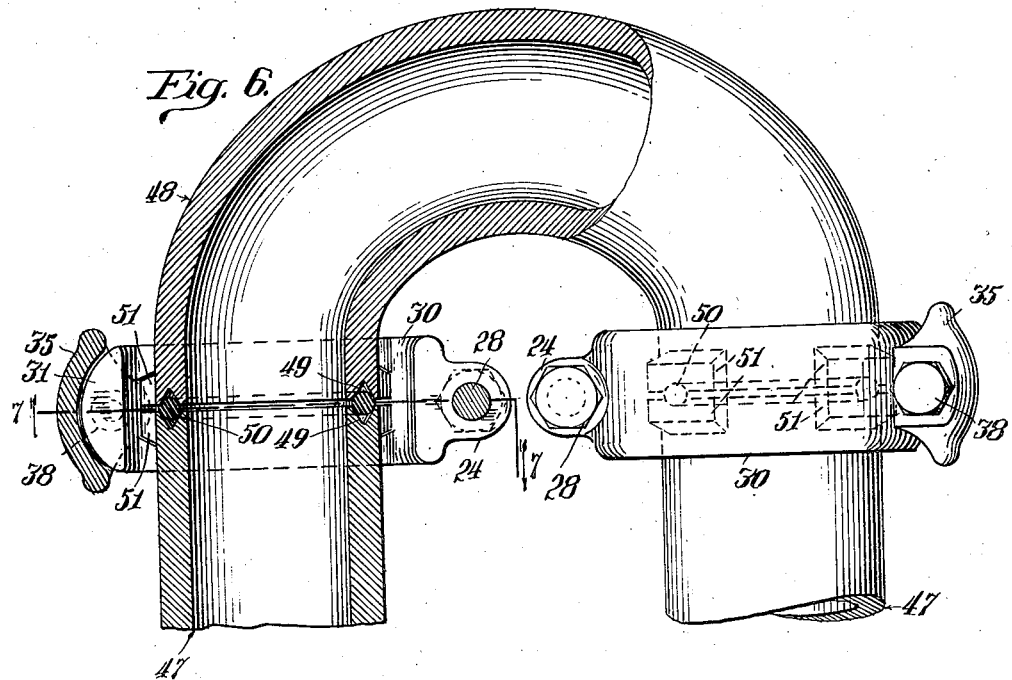
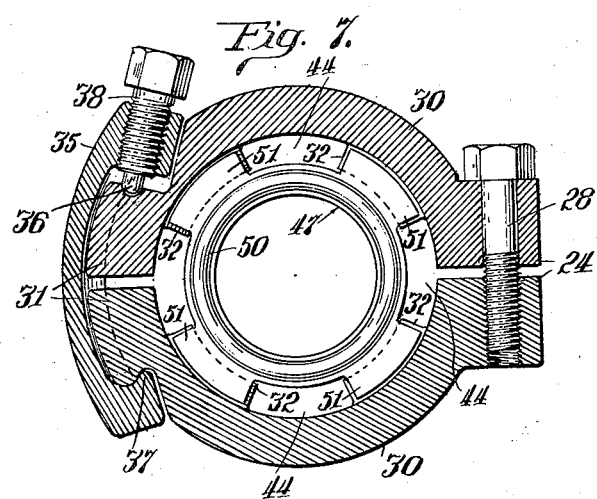

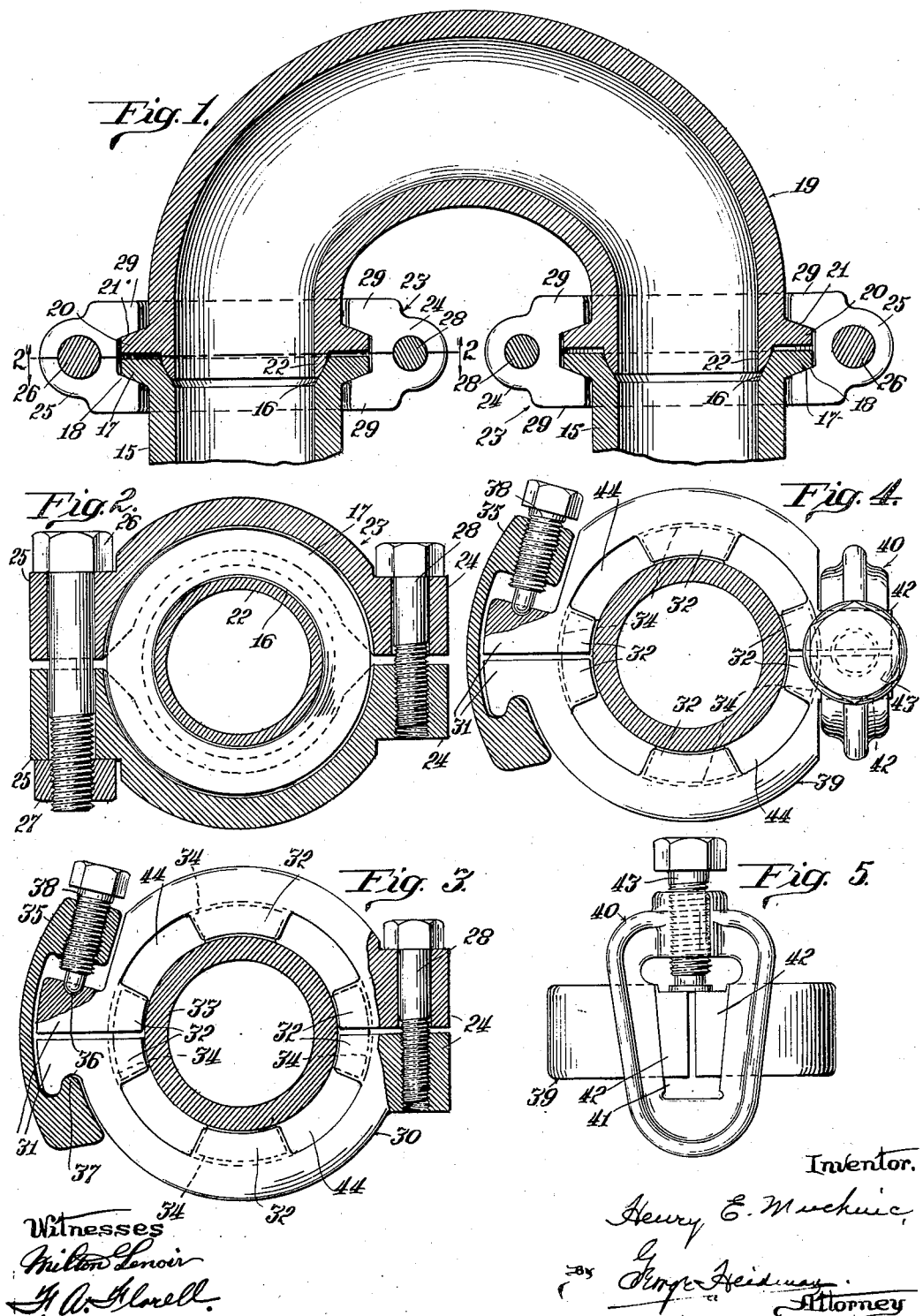

Patented Dec. 25, 1934

1,985,544

UNITED STATES PATENT OFFICE 1,985,544

RETURN BEND JOINT

Henry E. Muchnic, Atchison, Kans., assignor to The Locomotive Finished Material Company, Atchison, Kans., a corporation of Kansas Application April 17, 1933, Serial No. 666,515

1 Claim. (Cl. 285—20)

My invention relates to means for producing pressure resisting joints, as for example between the parallel rows of tubes or pipes and the return bends of oil stills and the like; although equally well adapted to tubes or pipes intended for other purposes. The invention, more specifically stated, relates to the manner of providing fluid tight joints between the adjacently arranged ends of the pipes or the pipes and return bends, in conjunction with means for maintaining such joints against the pressures within the tubes or pipes.

The invention has for its object the provision of tubes or fluid conveying sections whose contacting or matching ends are formed so tight joints may be readily effected, together with means cooperating with the sections for drawing and firmly holding these sections in fluid-tight and pressure resisting relation, while at the same time permitting easy assembly and dissociation of the sections when occasions require and particularly in close or confined areas where space for manipulation is greatly restricted, as is the case in most oil still installations; while at the same time permitting easy manipulation of the joint retaining means.

The objects and advantages of my invention will be readily understood from the following detailed description of the drawings, wherein:

Figure 1 is a sectional view of the adjacent ends of two pipes and a return bend with means for maintaining the joint relation.

Figure 2 is a cross-sectional view taken substantially on the line 2—2 of Figure 1.

Figure 3 is a cross-sectional view substantially similar to Figure 2, illustrating a modification.

Figure 4 is a similar sectional view illustrating another modified form of joint retaining means.

Figure 5 is a side elevation of the form shown in Figure 4, as viewed from the right hand side.

Figure 6 is a section and elevation of a return bend and adjacent ends of two pipes with means for maintaining the joint relation.

Figure 7 is a cross sectional view taken substantially on the line 7—7 of Figure 6.

As previously stated, while my invention may be employed for effecting any conduit or pipe joint, it is especially adapted for use in connection with the return bends employed in oil stills, permitting stream line connections to be provided between the parallelly arranged tubes or pipes of the still, in order that the difficulties of turbulence and pressure reduction as heretofore encountered in oil stills may be reduced.

My invention also involves a joint which may not only be easily effected, but at the same time readily disconnected without necessitating complete dissociation of the bend holding means from the associated conduit, particularly in oil still installations where frequent cleaning of the tubes is necessary.

In the particular exemplification of the invention as shown in Figures 1 and 2, pipe or tube sections are shown at 15, with the orifices shown enlarged or offset at 16 and flared by the beveled or sloping walls; while the exteriors of the tubes are shown provided with annular flanges 17, preferably coincident with the immediate ends of the tubes.

That is to say, the upper faces of the flanges are shown substantially flat, while the opposite or lower faces of the flanges are beveled or tapered toward the outer perimeters of the flanges as shown at 18.

A return bend section is shown at 19, provided on its exterior with annular flanges 20, provided with substantially flat faces corresponding to and coextensive with the opposing faces of the flanges 17 of the pipe sections; and with the opposite or upper faces 21 of the flanges 20 tapered in a manner similar to that of the flanges of the pipe sections.

The ends of the return bend section may each be provided with an annular lip or extension 22 disposed beyond the flange 20; the outer faces of the lips may either be beveled or tapered to correspond with the beveled or tapered portion of the orifices of the tube sections 15; or these lips may be slightly arcuate as shown to provide a line contact. The length of the lips 22 is preferably less than that of the tapered portion 16 of the orifice of the tube sections; the relation between the joints being such that a spaced relation between the opposing faces of the flanges 17 and 20 is maintained, as shown in Figure 1.

With this construction a fluid tight joint may be effected without resort to the use of gaskets.

The means for maintaining the joint in this instance is shown in the nature of a two piece encircling element 23 consisting of two semi-circular members whose ends are formed with the outwardly disposed matching lugs 24, 25. The lugs 25, 25 of the two members of the element 23 are shown apertured and provided with the bolt 26 having a nut 27; while at least one of the lugs 24, 24 has a tapped hole to receive the threaded end of the screw-stud 28.

Both members of the element 23, on their inner surfaces are provided with semi-circular flanges 29, 29 spaced axially apart or one above the other to an extent substantially equal to the distance between the tapered surfaces of the flanges on the pipe sections and the return bend. The opposing faces of the upper and lower flanges 29 are tapered to correspond to the tapers of flanges on the return bend and of the conduit flanges, thus permitting the flanges of the pipe sections and of the return bend to enter between the two flanges 29, 29 of both sections or members of the encircling element. It will be understood, of course, that the spacing between flanges 29, 29 is such that the two sections or members of the element 23 will be spaced apart at their ends, in order that contraction or drawing together of the members may be accomplished and a firmer fluid tight and pressure resisting relation between sections 15 and 19 maintained.

After the two members of the clamp or encircling element 23 have been properly positioned about the flanges of the pipe sections and return bend by the screw-stud 28, the clamp members are then tightly drawn together by the nut 27 on bolt 26; the screw-stud 28 constituting means for a rapid take-up of the slack in the clamp itself, while the bolt and nut constitute means for providing the desired power and pressure whereby the pipe and bend sections are forced toward each other.

In Figure 3 I illustrate a modification wherein the encircling element or clamping means 30, like element 23, preferably consists of two segmental members whose ends are provided with outwardly disposed lugs 24, 31 while the inner perimeters of the members are provided with interrupted flanges spaced apart, one above the other in a manner similar to the flanges 29, 29 of the clamp 23.

That is to say, the interrupted flanges in Figure 3 each consists of spaced apart radially disposed flange portions 32 arranged in spaced apart rows; and the opposing faces of the flange portions of the two rows tapered toward the inner perimeters of the flange portions 32 like the taper of the flanges 29, 29 of element 23. With this construction of encircling element, it will be understood that the adjacent ends of the conduit sections, one of which is shown in cross section at 33, and of the return bend, are also provided with interrupted flanges, similar to that shown in my copending application Serial No. 652,852, and having tapered surfaces like the flanges 17 and 20 in Figure 1; the pipe flange portions being indicated in dotted lines at 34 in Figure 3. The lugs 24 of the clamp 30, or at least one of them, is provided with a tapped hole to receive the threaded end of screw-stud 28, like in Figure 2; while the lugs 31 are provided with the somewhat C-shape yoke member 35.

The lugs 31 are preferably shown provided with sockets as at 36, to receive the lip 37 at one end of member 35 and the compression bolt 38 at the other end.

It is apparent with this construction, that the contacting relation between the pipe sections and return bend can be effected through partial rotation of the element or clamp 30 so as to position the flange portions 32 in overlapping relation with the flange portions 34 of the conduit and return bend. The slack or play between the clamp sections is then taken up by the quick acting screw-stud 28, and power or contracting pressure produced by the compression bolt 38 of the C-shape member 35 at the opposite side of the clamp 30.

Fluid tight relation between the conduits and return bend is induced by the cooperating tapered surfaces of the flange portions on the conduits, return bend and the clamp 30.

In Figures 4 and 5 I illustrate a modification of the encircling or clamp element and the take-up means shown in Figure 3. That is to say, the clamp element 39 is substantially like element 30, having the interrupted flanges 32, the ends or socketed lugs 31 provided with the C-shaped take-up means 35, heretofore described and shown in Figure 3. The modification of Figures 4 and 5 merely differs in the employment of another type of take-up means (similar to that shown in my previous application Serial No. 652,852) shown at 40, in the form of a continuous yoke having an opening 41 tapered toward one end as shown in Figure 5, into which the ends or lugs 42 of clamp element 39 extend; the outer sides of the ends 42 being tapered or sloped like the walls of the opening 41 in yoke 40. The large end of the yoke 40 is provided with pressure screw 43 adapted to exert pressure on the ends or lugs 42 and cause them to ride toward the narrower end of the yoke and hence force the segments of the encircling or clamp element into conduit and bend contracting position.

It is apparent that when the continuous yoke 40 has been applied, the clamp members or sections will be held together and positioning of the clamp about the flange portions of the pipe or conduit sections permitted by partial rotation of the clamp until the flange portions of the clamp are arranged in lapping relation with the flange portions of both pipe sections and return bend; at which time the C-shaped or hook member 35 may be applied and contraction of the clamp had by screwing up compression bolt 38, whereby great power or pressure may be obtained.

It is apparent that the closed yoke means 40 may be substituted for the C-shape type 35 in Figure 3, while the opposite side of the clamp may have the quick take-up means shown in Figure 3.

I prefer to make the clamps in two pieces as shown instead of a single piece for the reason that a two piece clamp may be used in practice without exact alignment, as is necessary in a single or one piece clamp.

Where the clamp is used on the pipes and return bends of oil stills it is subject to high temperatures, causing the temperature of the clamp at times to reach a high degree.

In order to meet these conditions, therefore, I prefer to employ the two piece clamp with the interrupted flanges as described and to employ a pair of take-up elements; one of said elements being intended for a rapid take-up whereby the clamp members or sections are drawn into position about the pipe and bend flanges, while the other element is employed to induce the clamp to exert the required power or pressure on the pipe and bend flanges for drawing the adjacent pipe ends and bends into fluid tight and pressure resisting relation.

In many of the oil still installations there is very little space at the return bend ends of the tubes which are rather closely nested or arranged, thus making it difficult to apply clamping means and at times making it impossible to apply a single piece clamp or one wherein the clamp is composed of two hingedly connected members which would require the clamp members to be widely spread apart for application.

My two piece or sectional interrupted flange type of clamp is especially adapted to the conditions just mentioned, because the interrupted flange clamp may be assembled and inserted onto the end of the pipe before the return bend is put into place.

After the return bend has been properly positioned, the clamp may be slid along the pipe so as to encircle the adjacent ends of the pipe and of the bend, when a partial turn of the clamp will cause its segmental flange portions to simultaneously overlap the flange portions of both pipe and bend, at which time the clamp contracting or take-up means are adjusted to provide the desired clamping action on the joint.

It is apparent that after this clamp has been applied and need for removing the return bend arises—(which periodically must be done in oil stills for cleaning)—this clamp may be easily removed or released by a partial unscrewing of the take-up elements sufficiently to permit rotative movement of the clamp until the flange portions thereof are moved out of contact or register with the flange portions of the return bend and pipe sections and are disposed in alignment with the segmental spaces shown at 44 (Figure 3) in the pipe and bend interrupted flanges. This will enable the clamp to be slid along the pipe away from the joint while still remaining in encircling relation with the pipe; and likewise reapplication of the clamp to the joint may also be readily accomplished.

It is also apparent that with the tapered or beveled contacting surfaces on the flanges of the pipe, return bend and clamp great clamping action is obtained and a pressure resisting joint provided.

In Figures 6 and 7 I illustrate another form of joint, wherein the adjacent pipe and return bend ends 47 and 48 are of similar construction; that is to say, both ends are provided with a tapered or V-shape groove 49, of a predetermined degree of incline or angle; and the grooves provided with an annular gasket 50, shown circular in cross-section and of a thickness which will cause the gasket to seat in the grooves 49 of the pipe and return bend sections and thereby effect fluid-tight relation between the sections when they are drawn together by clamping means of the character described.

The means, as previously described, are adapted to engage with the tapered flange portions 51, 51 on the outer sides of the pipes and of the return bend.

I have illustrated what I believe to be the simplest and best embodiments of my invention and have described the same in terms employed for purposes of description; although modifications may be made without departing from the spirit of the invention as defined in the appended claim.

What I claim is:

In a return bend joint, conduit sections and a return bend intermediate of the ends of the sections, the ends of the conduit sections and of the return bend being each provided with an annular socket, V-shape in cross-section, while the outer surface adjacent each end is provided with a radially disposed interrupted flange, with the sides of the flanges disposed away from the ends being tapered; an annular gasket, circular in cross-section, adapted to enter the sockets in the ends of a conduit section and of the return bend; in combination with a segmental encircling band having axially spaced apart interrupted and tapered flanges on the inner perimeter adapted to receive the interrupted flanges of a conduit section and of one end of the return bend therebetween, the ends of the band-segments being disposed laterally; regulable take-up means associated with the ends of the band segments at one side of the assembly whereby the band segments are held in place, and regulable pressure applying means at the opposite side of the assembly whereby the ends of the conduit sections and of the return bend are forced toward each other.

HENRY E. MUCHNIC.